United States Patent
Kim et al.

(10) Patent No.: US 8,026,329 B2
(45) Date of Patent: Sep. 27, 2011

(54) POLYCARBOSILANE AND METHOD OF PRODUCING THE SAME

(75) Inventors: Young Hee Kim, Seoul (KR); Soo Ryong Kim, Seoul (KR); Woo Teck Kwon, Seoul (KR); Jung Hyun Lee, Seoul (KR)

(73) Assignee: Tokai Carbon Korea Co., Ltd., Gyeonggi-Do (KR)

( * ) Notice: Subject to any disclaimer, the term of this patent is extended or adjusted under 35 U.S.C. 154(b) by 207 days.

(21) Appl. No.: 12/483,318

(22) Filed: Jun. 12, 2009

(65) Prior Publication Data
US 2009/0318655 A1 Dec. 24, 2009

(30) Foreign Application Priority Data
Jun. 24, 2008 (KR) ................. 10-2008-0059412

(51) Int. Cl.
*C08G 77/12* (2006.01)
(52) U.S. Cl. ........................... 528/14; 528/31
(58) Field of Classification Search .......... 528/14, 528/31
See application file for complete search history.

(56) References Cited

U.S. PATENT DOCUMENTS

| | | | |
|---|---|---|---|
| 4,052,430 A | | 10/1977 | Yajima et al. |
| 4,347,347 A | * | 8/1982 | Yajima et al. ................. 528/30 |
| 4,359,559 A | * | 11/1982 | Yajima et al. ................. 525/475 |
| 4,377,677 A | * | 3/1983 | Iwai et al. ...................... 528/35 |
| 4,808,659 A | * | 2/1989 | Nishihara et al. ............. 524/701 |
| 4,818,732 A | * | 4/1989 | Fox et al. ....................... 501/81 |
| 4,929,507 A | * | 5/1990 | Nishihara et al. ............. 428/447 |
| 5,204,434 A | * | 4/1993 | Sartori et al. .................. 528/14 |
| 6,761,975 B1 | * | 7/2004 | Chen et al. ..................... 428/429 |
| 7,749,425 B2 | * | 7/2010 | Malenfant et al. ............. 264/642 |
| 2007/0142203 A1 | * | 6/2007 | Malenfant et al. ............. 501/88 |
| 2007/0167599 A1 | * | 7/2007 | Shen .............................. 528/36 |
| 2008/0039311 A1 | * | 2/2008 | Malenfant et al. ............. 501/87 |
| 2009/0318655 A1 | * | 12/2009 | Kim et al. ...................... 528/14 |

OTHER PUBLICATIONS

Matyjaszewski et al. "Anions and radicals as intermediates in the reductive coupling of disubstituted dichlorosilanes with sodium" Polymer Bulletin, 22, 1989, 441-448.*

* cited by examiner

*Primary Examiner* — Robert Loewe
(74) *Attorney, Agent, or Firm* — Leydig, Voit & Mayer, Ltd.

(57) ABSTRACT

Provided are polycarbosilane and a method of producing the same. The polycarbosilane contains an allyl group, and thus can be cured by UV absorption when not exposed to the air.

4 Claims, 3 Drawing Sheets

POLYCARBOSILANE AND METHOD OF PRODUCING THE SAME

BACKGROUND OF THE INVENTION

1. Field of the Invention

The present invention relates to polycarbosilane and a method of producing the same.

2. Description of the Related Art

Generally, polycarbosilane (PCS) is a pre-ceramic precursor that is widely used as SiC coating, SiC powder, a precursor for SiC combination materials, a sintering additive for SiC powder, or a precursor for producing SiC-based continuous fiber, to improve oxidation resistance, drug resistance and heat resistance.

While polycarbosilane is generally prepared from polydimethylsilane (PDMS) as an initial material by the Yajima method which is performed over about 400° C. at high pressure (U.S. Pat. No. 4,052,430), various methods of producing polycarbosilane using various catalysts are being developed.

Since such polycarbosilane is generally cured by heat in air at 200° C. or more after coating, when it is converted into siliconcarbide (SiC) by heat treatment at high temperature, the content of oxygen is increased, resulting in degradation of final quality.

Meanwhile, to reduce the content of oxygen in the final product, electron beam curing is performed. In this case, the high cost of an electron beam application device increases production costs.

SUMMARY OF THE INVENTION

The present invention is directed to polycarbosilane capable of being cured by UV absorption when not exposed to the air, and a method of producing the same. In addition, the present invention is also directed to polycarbosilane having good solubility in organic solvents and having a high molecular weight.

According to an exemplary embodiment of the present invention, polycarbosilane includes a structural unit of Formula 1 containing an allyl group and a structural unit of Formula 2 containing a phenyl group, and its weight-average molecular weight (Mw) when converted into polystyrene, as measured by gel permeation chromatography (GPC), is 2000 to 6000.

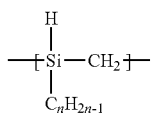

[Formula 1]

(n is an integer equal to or greater than 3)

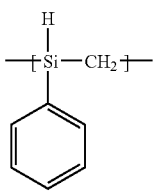

[Formula 2]

In the present invention, polycarbosilane contains an allyl group, so that it is possible to produce a final product having a low content of oxygen after curing in an inert gas atmosphere, such as nitrogen, without curing by heat in the air.

The polycarbosilane according to the present invention may contain an allyl group of 3 to 10 carbon atoms, and preferably, the polycarbosilane may contain an allyl group of 3 to 5 carbon atoms, which causes better curability by UV absorption.

When the polycarbosilane according to the present invention includes the structural unit of Formula 1 and the structural unit of Formula 2 in a molar ratio of 9:1 to 1:9, it is more preferable for curing by UV absorption.

According to an another exemplary embodiment of the present invention, polycarbosilane including a structural unit of Formula 1 and a structural unit of Formula 2 may be used as a precursor for SiC coating by dissolving 10 to 30 wt % polycarbosilane in one or more organic solvents selected from hexane, toluene and tetrahydrofuran.

A method of producing polycarbosilane according to the present invention will be described below.

To produce polycarbosilane according to the present invention, first, polyallylphenylsilane is synthesized.

Metal sodium is dispersed in an organic solvent. An organic solvent may be one or a mixture of two or more organic solvents selected from toluene, xylene and tetrahydrofuran. The metal sodium is cut into appropriate sizes for easy dispersion in an organic solvent, mixed with the organic solvent, and then stirred to disperse the metal sodium in the organic solvent.

An allylmethylchlorosilane monomer is mixed with a phenylmethylchlorosilane monomer, and then the mixed monomer solution is injected into the solution in which the metal sodium is dispersed. Here, it is important to sufficiently stir and mix the allylmethylchlorosilane monomer and the phenylmethylchlorosilane monomer before injection. If two monomers are simultaneously or separately injected without sufficient mixing in advance, these monomers may not synthesize into polyallylphenylsilane.

In the injection of the mixed monomer solution, it is also preferable to inject the mixed monomer solution at a rate of 300 ml/hr or less. When the rate is too high, e.g., more than 300 ml/hr, non-reactive monomers are lost, resulting in a decrease in yield of the final product. In consideration of production efficiency according to processing time, it is preferable to inject the mixed monomer solution at a rate of 50 ml/hr or more. Particularly, it is preferable to inject the mixed monomer solution at a rate of 50 to 150 ml/hr. In addition, the mixed monomer solution may be prepared by mixing the allylmethylchlorosilane monomer with the phenylmethylchlorosilane monomer in a molar ratio of 9:1 to 1:9.

Polyallylphenylsilane is polymerized by reaction of the mixed solution of the monomers and the metal sodium at 90 to 130° C., and a precipitate of the polymerized polyallylphenylsilane is separated. The polymerized polyallylphenylsilane is formed into a purple precipitate. A reaction product is cooled to room temperature, treated with excessive methanol to remove remaining metal sodium, and washed with distilled water and alcohol after filtering, thereby obtaining white polyallylphenylsilane powder. The obtained white powder is dried in vacuum before use.

Subsequently, the polyallylphenylsilane is subjected to the Kumada conversion reaction at high temperature to produce polyallylphenylcarbosilane.

The separated polyallylphenylsilane precipitate may be subjected to a first conversion reaction at 5 to 30 atm, 300 to 370° C. for 5 to 20 hours, and to a second conversion reaction at 5 to 30 atm, 400 to 470° C. for 5 to 20 hours, thereby producing polycarbosilane including the structural unit of Formula 1 containing an allyl group and the structural unit of Formula 2 containing a phenyl group.

When the reaction is processed at two-step temperatures, in the first conversion step, a silane bond is converted into carbosilane by the Kumada conversion reaction at 300 to 370° C. According to thermal analysis results for polyallylphenylsilane, the Kumada conversion reaction in which Si—Si bonds in the polyallylphenylsilane abruptly start to degrade at around 350° C., resulting in an increase in pressure, causes conversion to polyallylphenylcarbosilane. In the second conversion step, the converted carbosilane having a low molecular weight is polymerized at 400 to 470° C., and thus is converted into polyallylphenylcarbosilane having a suitable molecular weight for coating through polymerization due to low ceramic yield.

The entire experiment is performed in a nitrogen atmosphere, and during the reactions, the reactants are stirred by a stirrer. Here, an inert gas may be one or more selected from nitrogen, argon and helium gases.

While the above-described method is an example to produce polycarbosilane according to the present invention, the present invention is not limited thereto.

Therefore, the present invention provides polycarbosilane containing an allyl group, which has a low content of oxygen after curing and is easily dissolved in an organic solvent such as hexane, and thus can be used as a precursor for SiC coating because it can be cured by UV, and a method of producing the same.

BRIEF DESCRIPTION OF THE DRAWINGS

These and/or other objects, aspects and advantages of the invention will become apparent and more readily appreciated from the following description of exemplary embodiments, taken in conjunction with the accompanying drawings of which.

DETAILED DESCRIPTION OF THE INVENTION

Hereinafter, examples of the present invention will be described, and molecular weights, Fourier Transform Infrared (FT-IR) Spectroscopy results, and X-ray diffraction (XRD) results were measured by the following methods.

<Molecular Weight>

Number-average molecular weight (Mn), weight-average molecular weight (Mw) and molecular weight distribution (Mw/Mn) when converted into polystyrene were measured by gel permeation chromatography (GPC).

Device: GPC, Waters Co.

Sample Preparation Method: 1 mg of a polymer obtained from the final polymerization reaction was dissolved in 1 ml of tetrahydrofuran (THF), and then 100 µl of the resulting solution was injected.

Solvent: The molecular weights were measured by injecting THF at a rate of 1 ml/min.

Other environmental conditions: A GPC column was made by connecting two Zorbax mixed-b columns, and then used at 40° C.

Detection Method: A refraction index (RI) was detected by a refractometer.

<Infrared Spectroscopy (e.g., FT-IR Spectroscopy)>

Device: FTS-175C FT-IR

Sample Preparation Method: 3 mg of a sample was well mixed with 1 g of completely-dried KBr in a mortar, and then a pellet was made for use in a diameter of 10 mm by applying a pressure of 10 GPa.

<X-Ray Diffraction (XRD)>

Device: MO3XMF (MAC Science Co. Ltd.)

Sample Preparation Method: A sample was sintered at 1200° C. for 4 hours, and then scanned at a rate of 0.500°/min to obtain XRD data.

Example 1

2 L of a toluene solvent was first placed in a 4-neck round flask, and 320 g of metal sodium cut into a size of 8 $cm^3$ was then mixed with the solvent and stirred in a nitrogen atmosphere. The mixture was heated to 110° C. to disperse the metal sodium in the toluene organic solvent.

An allylmethyldichlorosilane monomer was mixed with a phenylmethyldichlorosilane monomer in a molar ratio of 9:1, and 800 ml of the mixed monomer solution was injected into the solution in which the metal sodium was dispersed at a rate of 100 ml/hr using a funnel for 12-hour reaction at 110° C. When a purple precipitate formed after the reaction, the resulting product was cooled to room temperature, treated with methanol to remove remaining sodium, and washed with distilled water and alcohol after filtering, thereby obtaining white polyallylphenylsilane powder.

The white polyallylphenylsilane powder was dried in vacuum, and transferred to an autoclave, in which a first conversion reaction was performed under 10 atm at 350° C. for 6 hours, and then a second conversion reaction was performed at 450° C. for 6 hours, resulting in the synthesis of polyallylphenylcarbosilanes having various molecular weights.

The entire experiment was performed in a nitrogen atmosphere, and during the reaction, the reactants were stirred by a stirrer.

After the final reaction, the reactant was dissolved in hexane and filtered to remove polyallylphenylcarbosilane that was not dissolved in hexane. After distilling hexane, polyallylphenylcarbosilane was obtained.

Figure 1:
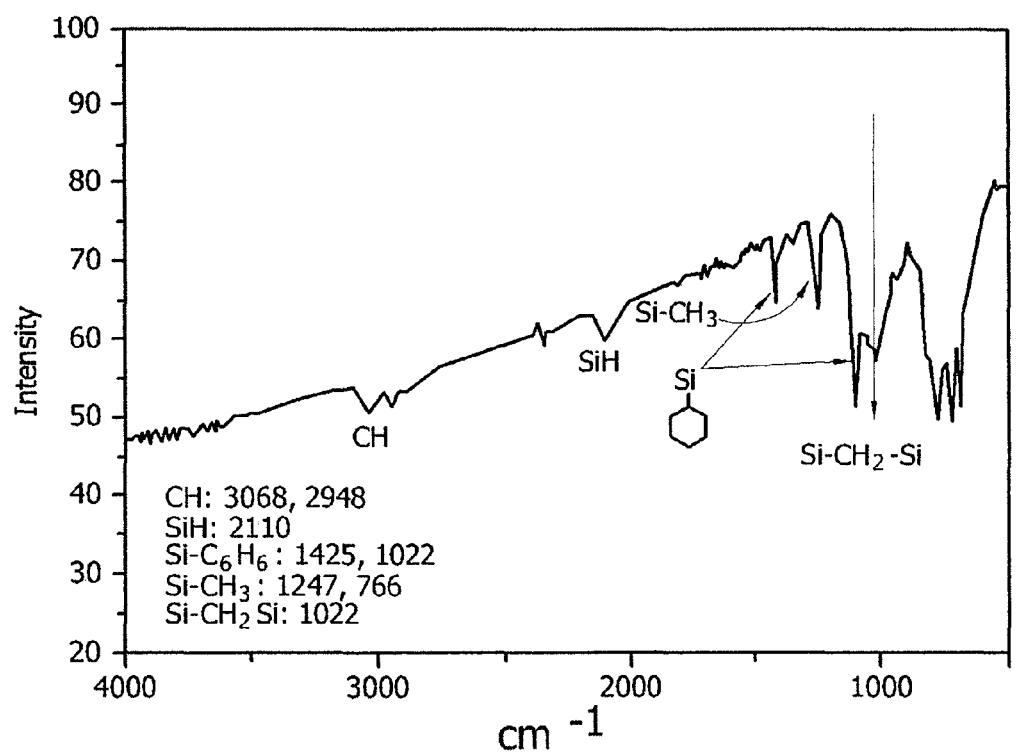
FIG. 1 is a graph showing FT-IR measurement results of polyallylphenylcarbosilane produced according to Example 1 of the present invention.
Figure 2:
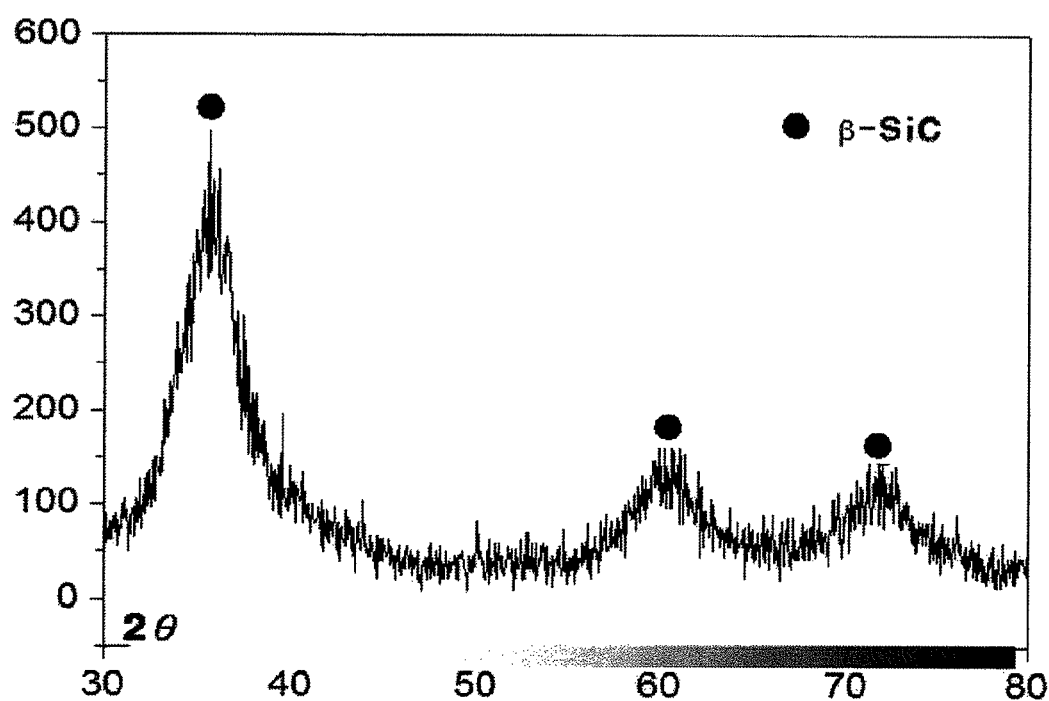
FIG. 2 is a graph showing XRD measurement results of polyallylphenylcarbosilane produced according to Example 1 of the present invention after heat treatment at 1200° C.

A yield of the polyallylphenylcarbosilane was about 65%, the weight-average molecular weight (Mw) when converted into polystyrene measured by GPC was 2180. According to the FT-IR measurement results shown in FIG. 1, a strong peak of —Si—$CH_2$—Si was shown at 1035 $cm^{-1}$. From these data, it can be confirmed that polyallylphenylcarbosilane includes a structural unit of Formula 3 containing allyl and phenyl groups. In addition, the polyallylphenylcarbosilane was treated with heat at 1200° C. in an argon atmosphere, and analyzed by XRD. The result, as shown in FIG. 2, was matched with that of β-SiC, and thus it can be confirmed that the polyllaylphenylcarbosilane is a suitable material for a SiC precursor.

<Formula 3>

$$\left[\begin{array}{c} H \\ | \\ -Si-CH_2- \\ | \\ CH_2 \\ | \\ CH_2=CH \end{array}\right]_{0.10n} \quad \left[\begin{array}{c} H \\ | \\ -Si-CH_2- \\ | \\ C_6H_5 \end{array}\right]_{0.90n}$$

The polyallylphenylcarbosilane yielded in Example 1 of the present invention was dissolved in hexane to a concentra tion of 30 wt % and thus could be used as a precursor for SiC coating.

Example 2

2 L of toluene solvent was first placed in a 4-neck round flask, and 320 g of metal sodium cut into a size of 8 cm³ was then mixed with the solvent in a nitrogen atmosphere. The mixture was heated to 110° C. and stirred to disperse the metal sodium in the toluene organic solvent.

An allylmethyldichlorosilane was mixed with a phenylmethyldichlorosilane monomer in a molar ratio of 5:5, and 800 ml of the mixed monomer solution was injected into the solution in which the metal sodium was dispersed at a rate of 100 ml/hr using a funnel for 12-hour reaction at 110° C. When a purple precipitate formed after the reaction, the resulting product was cooled to room temperature, treated with methanol to remove remaining sodium, and washed with distilled water and alcohol after filtering, thereby obtaining white polyallylphenylsilane powder.

The white polyallylphenylsilane powder was dried in vacuum, and transferred to an autoclave, in which a first conversion reaction was performed under 10 atm at 350° C. for 6 hours, and a second conversion reaction was then performed at 450° C. for 6 hours, resulting in the synthesis of polyallylphenylcarbosilane.

The entire experiment was performed in a nitrogen atmosphere, and during the reaction, the reactants were stirred by a stirrer.

After the final reaction, the reaction product was dissolved in hexane and filtered to remove polyallylphenylsilane that was not dissolved in hexane. In the case of mixing the allylmethyldichlorosilane monomer with the phenylmethyldichlorosilane monomer in the molar ratio of 5:5, a large quantity of high molecular-weight polyallylphenylcarbosilane (Mw=6000 or more) that was not dissolved in hexane was produced. After distilling hexane, polyallylphenylcarbosilane having a low molecular weight that was dissolved in hexane was recovered.

Figure 3:
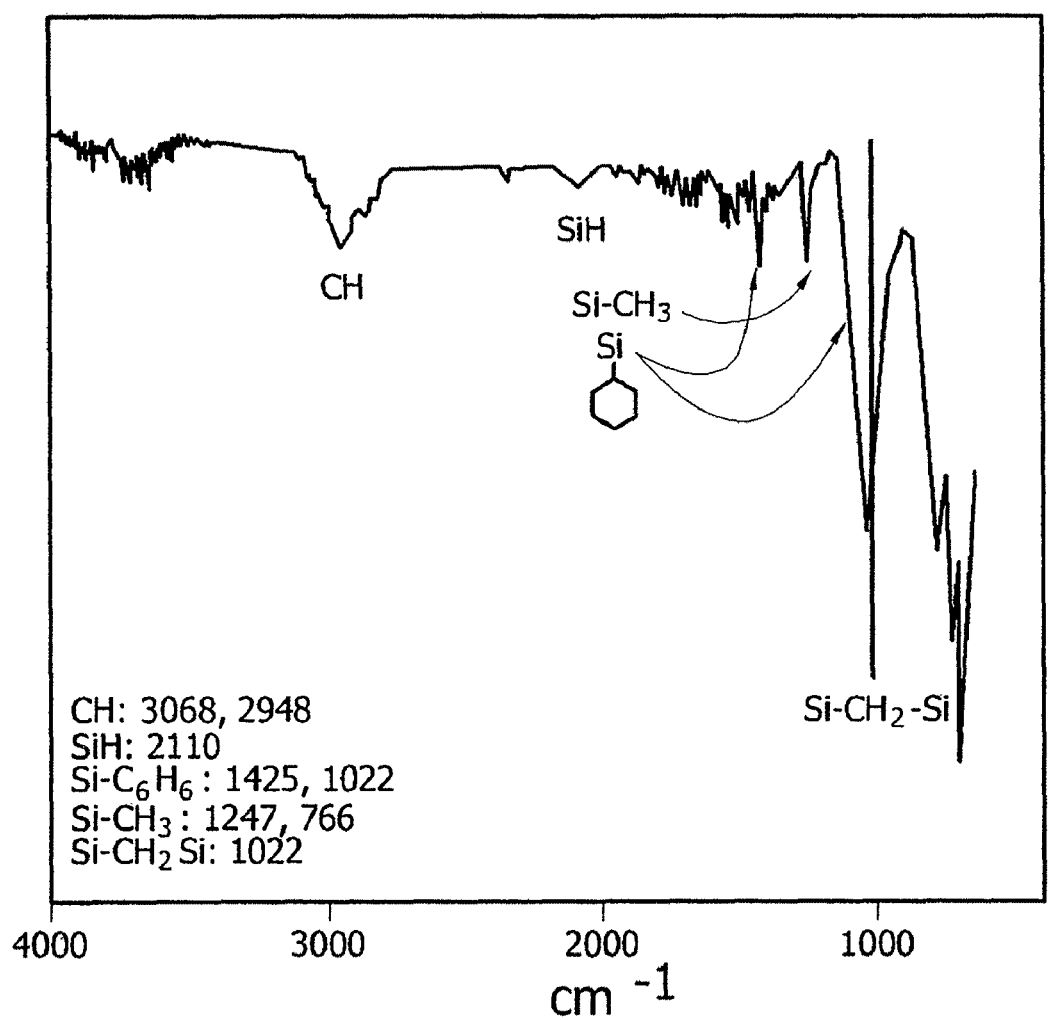
FIG. 3 is a graph showing FT-IR measurement results of polyallylphenylsilane produced according to Example 2 of the present invention.

A yield of the polyallylphenylcarbosilane was about 40%, and a weight-average molecular weight (Mw) when converted into polystyrene measured by GPC was 3140. According to the FT-IR measurement results shown in FIG. 3, a strong peak of —Si—CH$_2$—Si was shown at 1035 cm$^{-1}$, and thus it can be confirmed that polyallylphenylcarbosilane has a structural unit of Formula 4 including allyl and phenyl groups.

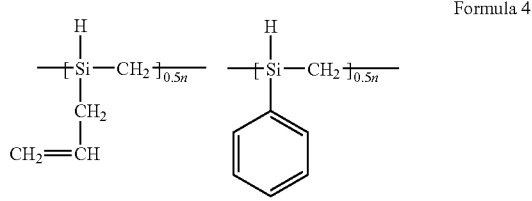

Formula 4

The polyallylphenylcarbosilane yielded in Example 2 of the present invention was dissolved in hexane to a concentration of 30 wt %, and thus could be used as a precursor for SiC coating.

Comparative Example

2 L of toluene solvent was first placed in a 4-neck round flask, and 320 g of metal sodium cut into a size of 5 cm³ was then mixed with the solvent in a nitrogen atmosphere. The mixture was heated to 110° C. and stirred to disperse the metal sodium in the toluene organic solvent.

340 ml of allylmethyldichlorosilane and 460 ml of phenylmethyldichlorosilane were individually prepared in a molar ratio of 5:5, and then both monomers were simultaneously injected into both sides of the round flask at a rate of 100 ml/hr for 12-hour reaction at 110° C.

While a purple precipitate formed after the reaction, the resulting product was separated into two layers, in which one layer floated over the toluene solvent and the other layer was precipitated to the bottom. That is, the allylmethyldichlorosilane monomer was separated from the phenylmethyldichlorosilane monomer, and thus polyallylphenylcarbosilane was not synthesized.

After that, the resulting product was cooled to room temperature, treated with methanol to remove remaining sodium, and washed with distilled water and alcohol after filtering, thereby obtaining white powder. The powder was dried in vacuum, and transferred to an autoclave, in which a first conversion reaction was performed under 10 atm at 350° C. for 6 hours, and a second conversion reaction was performed at 450° C. for 6 hours. However, no change occurred, that is, no polyallylphenylcarbosilane was produced.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of producing polycarbosilane, comprising:
dispersing metal sodium in an organic solvent;
pre-mixing an allylmethyldichlorosilane monomer with a phenylmethyldichlorosilane monomer, and injecting the mixed monomer solution into the solution in which the metal sodium is dispersed;
polymerizing polyallylphenylsilane by reaction of the mixed solution of the monomers and the metal sodium at 90 to 130° C.;
separating a precipitate of the polymerized polyallylphenylsilane;
performing a first conversion reaction on the separated polyallylphenylsilane precipitate under 5 to 30 atm at 300 to 370° C. for 5 to 20 hours; and
performing a second conversion reaction on the resulting product under 5 to 30 atm at 400 to 470° C. for 5 to 20 hours,
wherein the operations are performed in an inert gas atmosphere.

2. The method of claim 1, wherein, in injecting the monomers, the mixed monomer solution includes the allylmethylchlorosilane monomer and the phenylmethylchlorosilane monomer in a molar ratio of 9:1 to 1:9.

3. The method of claim 1, wherein, in injecting the monomers, the mixed monomer solution is injected at a rate of 300 ml/hr or less.

4. The method of claim 1, wherein, in dispersing the metal sodium, an organic solvent includes at least one selected from toluene, xylene and tetrahydrofuran, and the inert gas includes at least one selected from nitrogen, argon and helium gases.

* * * * *